| SWITCH | ONE PULSER TIMER REVOLUTION | TIME SW. CLOSED | SWITCH FUNCTION |
|---|---|---|---|
| 47 | ▬ | 1-MIN. | DRIVE MOTOR |
| 48 | ▬▬▬▬▬▬▬ | 4 MIN. 50 SEC. | PULSER TIMER MOTOR |
| 49 | ▬ | 13.5 SEC. | MAIN TIMER MOTOR |

INVENTORS
William B. Ripsco
Marvin G. Steffey
BY
ATTORNEYS

United States Patent Office 3,616,472
Patented Nov. 2, 1971

3,616,472
COMBINATION WASHER-DRYER CONTROL CIRCUIT
William B. Ripsco, Coloma, and Marvin G. Steffey, St. Joseph, Mich., assignors to Whirlpool Corporation, Benton Harbor, Mich.
Filed Mar. 3, 1970, Ser. No. 15,993
Int. Cl. D06f 33/02
U.S. Cl. 8—159    7 Claims

ABSTRACT OF THE DISCLOSURE

A control circuit for a combination washer-dryer laundry appliance which includes the capability of a pre-soak cycle prior to the commencement of the main washing cycle and an anti-wrinkle cycle following the normal drying operation, the various cycles of the appliance being under the control of a main timer means, with a pulser means being provided in conjunction therewith to intermittently actuate the main timer and drive means prior to the initiation of the washing cycle so that articles can be intermittently agitated in a pre-soak interval, with the pulser means also being capable of intermittently actuating the main timer and drive means at the conclusion of the normal drying cycle to provide the anti-wrinkle fluffing period.

BACKGROUND OF THE INVENTION

Field of the invention

This invention is in the field of automatic washer-dryer laundry appliances wherein the entire sequence of operations beginning with a pre-soak cycle, through a washing cycle, a spinning cycle, a drying cycle and an anti-wrinkle cycle under the control of a single main timer.

Description of the prior art

Modern day combination washer-dryers consist of a single cabinet having a perforate drum therein mounted on a horizontal axis. The combination washer-dryer goes through a timed sequence of events under the control of one or more timers, the timer programming the successive cycles which include the fundamental steps of first washing the fabrics by tumbling them in a washing solution by rotation of the drum, a spin cycle in which the drum is rotated at a high velocity so that much of the rinsing water occluded in the fabrics is extracted by centrifugal force, and finally a drying cycle in which the fabrics are tumbled in the rotating drum while passing a current of hot air through the drum.

Significant improvements in the drying of fabrics have been accomplished by the inclusion of an "anti-wrinkle" cycle at the end of the normal drying interval. In this type of cycle, the fabrics are subjected to a periodic fluffing by intermittent agitation to prevent the formation of deep set wrinkles which would otherwise result. The anti-wrinkle improvement for dryers has been described and claimed in Orr and Miller, U.S. Pat. No. 3,286,359 owned by the assignee of the present application.

Also, in relatively recent times, there has been a great deal of publicity on the effectiveness of a so-called pre-soak operation preparatory to the main washing cycle. In such pre-soak sequences the fabrics to be laundered are soaked for a period of ½ hour or so in a solution or suspension containing laundry enzymes which are said to be particularly effective in removing stains of proteinaceous origin.

Thus, for a combination laundry machine to have all of the features which are now expected by users, a pre-soak cycle must be added to precede the main washing cycle, and an anti-wrinkle cycle must be added to supplement the normal drying cycle. When these additional functions are added to a multi-function, washer-dryer combination, however, it may require a rather complex and expensive control circuit for initiating and terminating the various operations in the proper programmed sequence. For example, in Low Pat. No. 3,140,595 there is described a control circuit for a washing machine (not a washer-dryer combination) which includes a main timer and an auxiliary timer. The two timers are interconnected in such a manner that an extra rinse cycle and/or an extra pre-rinse or soak cycle may be selected by the operator by actuation of manually actuated switch members. In this type of arrangement, the auxiliary timer, when operative, directly controls the machine functions and when the auxiliary timer is operating, the main timer is rendered completely inoperative.

In Deiss U.S. Pat. No. 3,269,154 there is described another automatic washing machine which has the capability of a soak cycle during which the clothes in the machine are intermittently agitated. The control circuit in this arrangement includes a single timer provided with a sub-interval cam to provide the intermittent agitation. By using the sub-interval cam, however, the soak interval cannot extend over a long period of time and the period of soaking without agitation is limited to the period of time between escapements of the main timer which is normally on the order of two minutes.

SUMMARY OF THE INVENTION

The present invention provides a control circuit for a combination washer-dryer including a main timer mechanism which provides sequential control of washing and drying cycles in combination with a pulser means to intermittently energize the timer means and drive means at a time when the machine is filled with washing liquid to provide a soak-cycle with intermittent agitation and to intermittently energize the main timer and drive means at the end of the drying cycle to intermittently tumble the articles in the machine to provide an anti-wrinkle cycle.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is a timing chart which illustrates the sequence of switch operations in switches controlled by the main timer cams.

DESCRIPTION OF THE PREFERRED EMBODIMENTS

Figure 1:
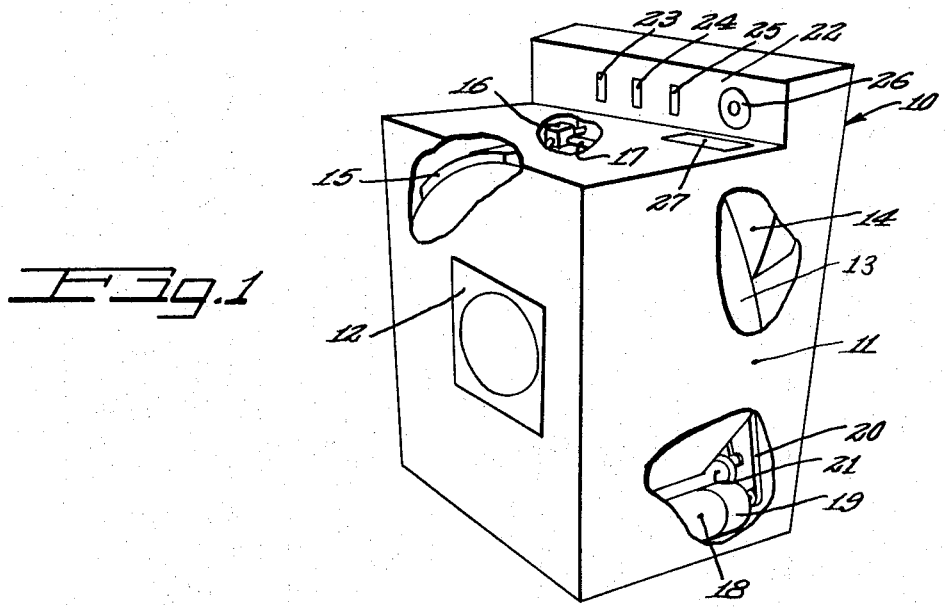
FIG. 1 is a view in perspective of a typical cabinet for a combination washer-dryer, with portions thereof being broken away to illustrate parts of the interior.

In FIG. 1, reference numeral 10 indicates generally a combination washer-dryer including a cabinet 11. An access door 12 is hingedly secured to the cabinet 11 to permit introduction and removal of the fabrics to be washed and dried in the machine. A tub 13 is mounted within the cabinet 10 on a horizontal axis and contained therein is a perforate drum (not shown) also mounted on a horizontal axis and in which the fabrics are washed and dried. Behind the tub 13 is a blower housing 14 containing a blower (not shown) which operates to direct heated air at the fabrics during the drying cycle. Adjacent the exterior of the tub 14 is a heater box 15 which contains the heating elements for drying the fabrics. At the back of the cabinet 11 there is flow valve 16 which is under the control of a flow valve solenoid 17.

Near the bottom of the cabinet 11, there is a drive motor 18 which is coupled to the remainder of the mechanism through a transmission 19. The rotatable perforate drum located within the tub 13 is driven from the transmission 19 by means of a belt 20. The same belt 20 is used to drive a drain pump 21 located adjacent the transmission 19.

At the top of the cabinet 11 there is a control console 22. On the face of the console 22 are three switches 23, 24 and 25 as well as the dial 26 which sets the main timer and its associated cam stack. Also located on the top of the cabinet 11 is an access door 27 which provides access to the lint screen associated with the dryer.

Figures 2, 4:
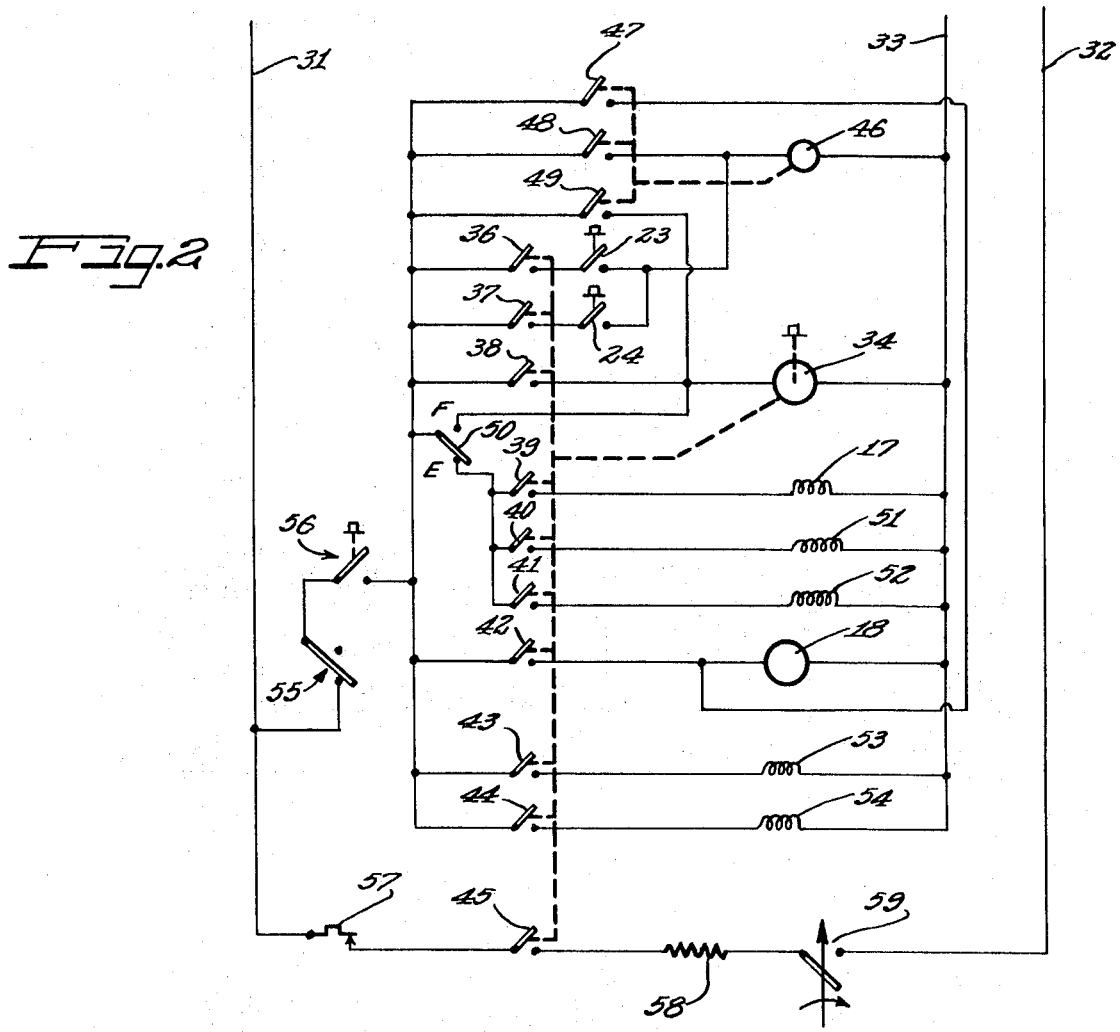
FIG. 2 is a circuit diagram of a portion of the electrical circuitry of the combination washer-dryer of the present invention, illustrating only those portions of the circuit which are germane to the invention here involved.
FIG. 4 is a timing chart illustrating the sequence of operations of the switches controlled by the pulser timer.

Referring next to FIG. 2, the circuit diagram there illustrated is arranged to be energized from a pair of 220 volt lines 31 and 32 and a neutral line 33. A main timer motor 34 is connected between the neutral line 33 and a line 35. The dial 26 is mechanically coupled to the timer motor 34 to adjust the timer motor 34 and its associated cam stack to any desired position.

The main timer motor 34, through its cam stack, controls a plurality of switches 36 through 45, each of its switches 36 through 45 being open or closed depending upon the portion of the cycle and the configuration of the cam which operates that particular switch. The portion of each cycle during which each switch is closed may be seen by referring to FIG. 3, wherein a solid line indicates the particular switch has been closed by a cam driven by the timer motor 34. Also connected between line 33 and line 35 is a pulser timer motor 46. Associated with this pulser timer motor 46 are three cam operated switches 47, 48 and 49. The portion of each pulser timer revolution during which each of the switches 47 and 49 is closed by their respective cams can be seen by referring to the timing chart of FIG. 4.

The timer motor 34 has three separate paths of energization through line 35. One path is through the cam operated switch 38. Another path by which the timer motor 34 can be energized is through a switch 50. The latter is a pressure responsive switch which responds to the level of liquid contained in the tub 13. Accordingly, when it is desired to fill the tub 13, the timer operated switch 38 opens and the timer stops until a predetermined level of liquid causes the pressure switch 50 to change from its empty to its full position, providing a parallel path of energization for the timer 34.

The other path of energization for the timer motor 34 is by means of a cam operated switch 49 associated with the pulser timer motor 46.

The pulser timer motor 46 also has three paths of energization. Two of the paths are through the cam operated switches 36 and 37, respectively. In series with these switches are the manually operated switches 23 and 24, respectively. The manually operable switch 23, when closed, serves to introduce an anti-wrinkle cycle following the normal drying cycle while manually operated switch 24 operates to introduce an enzyme soak cycle preceding the normal wash cycle. The third path of energization for the pulser timer control 46 is through its own cam operated switch 48.

Referring back to the pressure sensitive switch 50, the "empty" terminal of this switch is connected in series with three parallel circuits. The first circuit includes the cam operated switch 39 and the aforementioned solenoid 17 which controls the flow valve 16 to allow liquid to flow into the machine when solenoid 17 is energized. The second parallel circuit includes the cam operated switch 40 and a solenoid 51. The solenoid 51 controls operation of the blower located in the blower housing 14. When cam operated switch 40 is closed the blower is energized causing a flow of air through the drum located inside the tub 13.

The third parallel circuit is through the cam operated switch 41 and the solenoid 52 which is connected to the transmission 19 to shift the same into a low spin gear ratio, in which position the drum inside the tub 13 is driven by the belt 20 at a low spin speed. It should be noted that each of these three parallel circuits just described are energized only when the pressure switch 50 is in its "empty" position indicating that the tub 13 is substantially empty of fluid.

The drive motor 18 is connected between lines 33 and 35. In series with the drive motor 18 is a cam operated switch 42 which is controlled by operation of the main timer motor 34. Another energizing circuit for the drive motor 18 exists through the switch 47 which is under the control of the pulser timer motor 46.

Also extending between lines 33 and 35 is the cam operated switch 43 and a solenoid 53 which, when energized, causes the drain pump 21 to operate, thereby pumping out liquid contained in the tub 13.

Another circuit connected between lines 33 and 35 includes the cam operated switch 44 and a solenoid 54 which, when energized, causes the transmission 19 to shift into a mode of operation such that the drum inside the tub 13 may be driven at a high spin speed through the belt 20.

Line 31 is connected to line 35 through a pair of switches 55 and 56. Switch 55 is located on the door 12 and closes when the door 12 is in its closed position. Switch 56 is a manually operable switch which may be closed by operation of switch 25 on the control panel. Thus, the control circuit may be energized when the door switch 55 has been closed and the operator pushes the switch button 56.

A heater circuit is connected between lines 31 and 32, and includes a thermostat 57, the cam operated switch 45, a heater element 58, together with a centrifugal switch 59. While an electrically energized heating element is shown in the drawings for purpose of convenience, it should be understood that the heater could be a gas-fired heating mechanism. The cam operated switch 45 is closed during the drying cycle, and centrifugal switch 59 is connected to the motor 18 so that it is closed only when the motor 18 reaches a predetermined speed. The thermostat 57 functions to open the circuit to the heater element when an excessive temperature is achieved.

The sequence of operations which occurs when the machine is set for an enzyme soak cycle, washing, drying and anti-wrinkle treatment can be observed by reference to FIGS. 3 and 4. To start the operation of the machine, the operator rotates the timer dial 26 to the beginning of the enzyme soak cycle, closes switch 23 to select the anti-wrinkle cycle, closes switch 24 to select the enzyme soak cycle, and closes switch 25 to initiate operation of the machine. With these steps taken, the timer 34 is in the fifty-eighth increment. At this period of time, cam operated switches 39 and 42 are closed. Accordingly, the flow valve solenoid 17 will be energized so that liquid will flow into the machine inasmuch as the pressure switch 50 is in its empty position. In addition, at this interval, the drive motor 18 is energized through the cam operated switch 42. When the level of the liquid in the machine reaches a predetermined point, the pressure switch 50 will move from its empty to its full position, thereby energizing the timer motor 34. After two intervals (of approximately two minutes duration each) the cam operated switch 38 closes, providing energization for the timer motor 34 independently of the pressure switch 50. At the sixty-second increment, cam operated switches 38 and 42 open, thereby interrupting the circuit to both the timer motor 34 and the drive motor 18. At the same time, however, the cam operated switch 37 closes and since switch 24 is closed, this energizes the pulser timer motor 46. By referring to FIG. 4, it will be seen that the pulser cam operated switch 47 closes for one minute of every five minutes to energize the drive motor 18 for the same period of time. In addition, pulser cam operated switch 49 closes for thirteen and one-half seconds each five minutes to energize timer motor 34 for this interval. This periodic energization of the timer motor 34 and drive motor 18 continues for five pulse timer revolutions of five minutes each in which time the timer motor 34 has been operated for a sufficient length of time to cause its cam operated switches 38 and 42 to reclose at the beginning of the sixty-fourth interval. Consequently, for a period of twenty-five minutes, the fabrics to be washed have been intermittently tumbled but they have remained at rest for a majority of the time in the washing fluid which may contain an enzyme soak compound added by the operator at the beginning of the enzyme soak cycle. In the sixty-fourth increment, the low spin cam operated switch 41, as well as the drain cam operated switch 43, is closed. When the drain pump 21, energized by drain solenoid 53, has removed sufficient fluid for the pressure switch 50 to move to its empty position, the transmission 19 is shifted by solenoid 52 to its low spin mode which causes the fabrics within the drum to be centrifuged at a low speed to remove excess fluid. At the end of the sixty-fourth interval, timer motor 34 advances the cam stack into interval No. 2 which is the beginning of the washing cycle.

The wash cycle begins with a flow period during which the timer motor 34 is deenergized since the cam operated switch 38 is open and the pressure sensitive switch 50 is in the empty position. Once sufficient fluid has entered the tub 13 to actuate the pressure sensitive switch 50 through the full position, the timer motor 34 is energized. At the end of two minutes, the timer 34 advances to interval No. 4 at which time the cam operated switch 38 closes to provide continuous energization for the timer motor 34 during the remainder of the washing cycle.

During intervals four through ten, the fabrics placed in the drum are tumbled in a washing fluid. During interval twelve, the low spin cam operated switch 41 and the drain cam operated switch 43 are closed. Drain solenoid 53 energizes drain pump 21. When sufficient liquid has been removed by the drain pump 21, the pressure switch 50 moves to its empty position thereby completing the circuit for the low spin solenoid 52 causing the transmission 19 to be transferred into a low spin mode. After the clothes have been spun for a one two minute interval, the machine again goes into a fill mode of operation for the rinse portion of the wash cycle. During this interval, the clothes are tumbled in a rinsing liquid. During interval 20, the machine again goes into a drain and low spin mode with the drain solenoid 53 and the low spin solenoid 52 again being energized.

At the beginning of interval twenty-four, the machine enters the high speed spin portion of the cycle. At this time, cam operated switch 44 closes, providing an energization path for solenoid 54 which causes the transmission 19 to shift into the high speed spin mode. The high speed spin continues into interval thirty-four at which time, the machine again goes into a drain mode of operation to remove any excess liquid. The wash cycle ends during interval thirty-eight.

The drying cycle commences at the time the washing cycle ends. The timer motor 34 is still energized through the cam operated switch 38. At this time, however, the blower solenoid 51 is energized by the cam operated switch 40 and the heater 58 is energized by the cam operated switch 45. The drying cycle continues through increment 48 at which time the blower solenoid 51 and the heater 58 are deenergized by opening of the cam operated switches 40 and 45, respectively. Following the drying cycle, the anti-wrinkle cycle commences since manually operated switch 23 has been closed. Timer motor 34 is energized for a portion of interval 50 by the cam operated switch 38. During interval 50, as cam operated switch 38 opens, the cam operated switch 36 closes. The closing of this switch provides an energization path for the pulser motor 46. When this occurs, the pulser motor 46 causes periodic closing of its cam operated switches 47 and 49 which intermittently advances the timer motor 34 and the drive motor 18 to provide intermittent tumbling of the material in the machine. The sequence of switch closings for the pulser motor 30 is shown in the chart of FIG. 4. For each five revolutions of the pulser motor 46 the timer motor 34 is advanced one increment from intervals 50 through 54. The total time for this advancement is one hundred and twenty-five minutes. At the end of interval 54, all cam operated switches open and the timer is in its off position, thereby completing the cycle and putting the control circuit in readiness for the next complete operation.

While the machine of the present invention has the capability of including both the enzyme soak cycle and the anti-wrinkle cycle in the operation, it is apparent that either could be omitted selectively. It should also be recognized that a different drying cycle could be provided in which the length of the cycle would be under automatic control such as by using an electronic dry control system or a thermostatic operation in which operation of the timer motor 34 would be interrupted and be placed under the control of an electronic or thermostatic dry control system. It should also be recognized that appropriate switching could be provided so that the machine could be operated through a wash only cycle or a dry only cycle in which the operator would set the timer dial 26 at the beginning of the appropriate portion of the cycle and select an additional switch to permit the machine to operate through one cycle only. Likewise, it should be recognized that while the various washing, rinsing and drying operations were described in one sequence other sequences could be provided. It should also be recognized that the operations described above could extend over a greater or lesser number of timer intervals to achieve desired performance.

The embodiments of the invention in which an exclusive property or privilege is claimed are defined as follows:

1. In a laundry appliance including a cabinet, washing means including
   a perforate rotatable drum within said cabinet, drying means within said cabinet for drying articles in said rotatable drum, and
   drive means for rotating said drum during the washing cycle for spinning said drum after the washing cycle and for tumbling the articles during a drying cycle, the improvement which comprises
      a control circuit including a main timer means arranged to actuate said drive means through said washing cycle, spinning and drying cycle, and
      a pulser means associated with said main timer means and arranged to intermittently actuate said main timer means and said drive means prior to initiation of said washing cycle to provide a soak cycle and to intermittently actuate said main timer and drive means after the completion of said drying cycle to provide an anti-wrinkle cycle.

2. The laundry appliance of claim 1 in which said pulser means is a pulser timer.

3. The laundry appliance of claim 2 which includes a first switch contact in series with said main timer motor and controlling energization thereof, said first contact being coupled to said main timer means, a second contact in parallel with said first contact, said second contact being coupled to said pulser timer, a third contact in series with said pulser timer to control energization thereof, said third contact being coupled to said pulser timer, a fourth contact in series with said drive means to control energization thereof, said fourth contact being coupled to said pulser timer, and a fifth contact in parallel with said third contact, said fifth contact being coupled to said main timer means, said main timer being arranged to close said fifth contact to initiate operation of said pulser timer, and said pulser timer being arranged to intermittently open and close said second contact and said fourth contact during its energization to thereby intermittently energize said main timer means and said drive means while said pulser timer is energized.

4. The laundry appliance of claim 3 which includes a sixth contact in parallel with said fifth contact and being coupled to said main timer means.

5. The laundry appliance of claim 4 in which said main timer is arranged to close said fifth contact before the start of said washing cycle and close the sixth contact at the conclusion of the drying cycle.

6. In an appliance adapted to wash and dry fabrics having
a first means to perform a washing operation including agitating said fabric in a wash liquid, agitating said fabric in a rinse liquid and spinning said fabric to centrifuge liquid from said fabric, and
a second means to perform a drying operation including tumbling fabrics in a heated airstream, the improvement comprising
third means to selectively precede said washing operation with a soak operation including intermittently agitating said fabric in a soak liquid, and
means including said third means to selectively follow said drying operation with an antiwrinkle operation including intermittently tumbling said fabric to prevent formation of deep set wrinkles.

7. The method of treating fabrics in an appliance adapted to wash and dry fabrics including
subjecting said fabric to a soak cycle including intermittent agitation of said fabric in a liquid,
subjecting said fabric to a washing cycle including washing, and rinsing said fabric in a liquid and spinning said fabric to remove liquid therefrom.
subjecting said fabric to a drying cycle including tumbling said fabric in the presence of a moving airstream, and subjecting said fabric to an antiwrinkle cycle following said drying cycle including intermittently tumbling said fabric.

References Cited

UNITED STATES PATENTS

| | | | |
|---|---|---|---|
| 3,140,595 | 7/1964 | Low | 68—12 R |
| 3,246,182 | 4/1966 | Hanchett | 68—12 R |
| 3,269,154 | 8/1966 | Deiss | 68—12 R |
| 3,286,359 | 11/1966 | Orr et al. | 34—12 |
| 3,365,809 | 1/1968 | Eppley | 34—12 |

WILLIAM I. PRICE, Primary Examiner

U.S. Cl. X.R.

68—12, 19.2